United States Patent [19]

Das

[11] 4,083,940

[45] Apr. 11, 1978

[54] COAL PURIFICATION AND ELECTRODE FORMATION

[75] Inventor: Subodh K. Das, Lower Burrell, Pa.

[73] Assignee: Aluminum Company of America, Pittsburgh, Pa.

[21] Appl. No.: 660,704

[22] Filed: Feb. 23, 1976

[51] Int. Cl.[2] ........................ C01B 31/02; C09C 1/48; C09C 1/56; C10G 29/04

[52] U.S. Cl. .................................... 423/449; 423/461; 44/1 R; 204/294

[58] Field of Search ............... 423/460, 461, 448, 449; 44/1 R; 204/294

[56] References Cited

U.S. PATENT DOCUMENTS

| | | | |
|---|---|---|---|
| 1,489,830 | 4/1924 | Illingworth | 423/449 |
| 1,840,491 | 1/1932 | Dietsche | 423/449 |
| 3,279,935 | 10/1966 | Daniell et al. | 423/460 |
| 3,393,978 | 7/1968 | Murphy et al. | 23/209.9 |
| 3,501,272 | 3/1970 | Benak | 423/461 |

OTHER PUBLICATIONS

Coal as a Source of Electrode Carbon in Aluminum Production, Bureau of Mines Report of Investigations, pp. 7, 8, and 1-6.

*Primary Examiner*—O. R. Vertiz
*Assistant Examiner*—Gregory A. Heller
*Attorney, Agent, or Firm*—Andrew Alexander

[57] ABSTRACT

A process for purification of coal comprises forming an aqueous leaching solution containing nitric and hydrofluric acid. Impurities are removed by contacting coal having a mesh size not greater than 8 (Tyler Series) with the leaching solution for a period of 15 to 120 minutes at a temperature of 20° to 100° C. During the contacting of coal with leaching solution, a gaseous material such as air can be bubbled therethrough to provide additional mixing action and oxidant material. Thereafter, the solution is removed and the leached coal washed with water.

21 Claims, 1 Drawing Figure

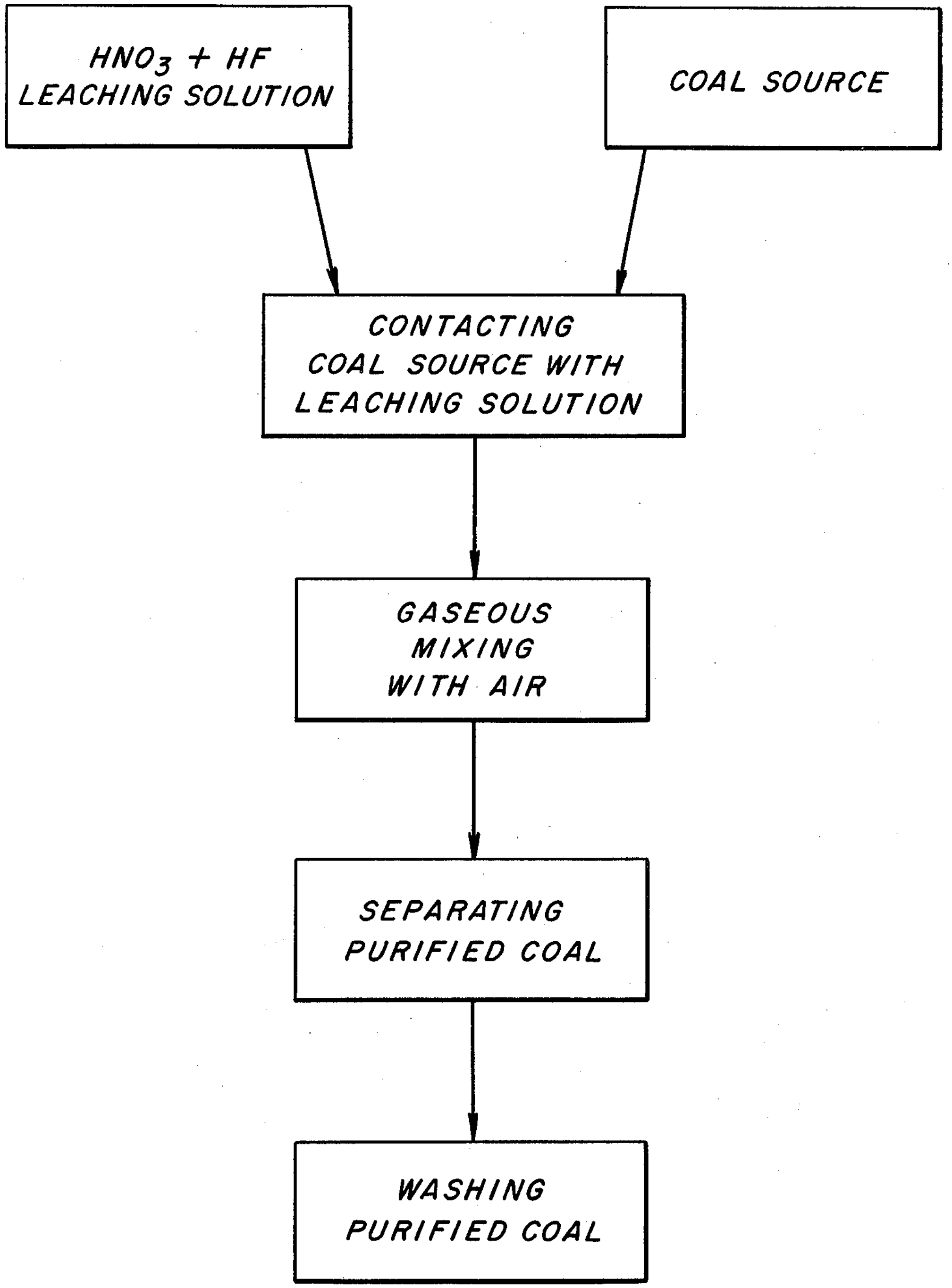
HNO3 + HF
LEACHING SOLUTION
COAL SOURCE
CONTACTING
COAL SOURCE WITH
LEACHING SOLUTION
GASEOUS
MIXING
WITH AIR
SEPARATING
PURIFIED COAL
WASHING
PURIFIED COAL

COAL PURIFICATION AND ELECTRODE FORMATION

INTRODUCTION

This invention relates to coal purification and more particularly to a method of purifying coal for use in carbon electrodes.

In the prior art, carbon electrodes used in aluminum producing cells, for example, a Hall cell, have been formed from petroleum coke or coke obtained from super-clean coal because such coke is relatively free of impurities thus requiring little or no purification. Because of the growing concern over the escalating cost and availability of petroleum coke and to reduce dependency thereon, considerable effort has been expended in acquiring alternate sources for electrode carbon. Because of its great abundancy, coal is considered to be the most logical alternative source. However, because of the impurities present in most coal, processes for providing such coal in highly purified form suitable for carbon electrodes have been virtually non-existent or are sufficiently involved as to be uneconomical for use in the production of aluminum, for example.

With respect to the level of impurities, Campbell et al in Bureau of Mines Report of Investigations 5191, on *Coal as a Source of Electrode Carbon in Aluminum Production* (Feb. 1956) at page 2, Table 1, indicate that, with respect to aluminum production, the following levels are applicable: ash max. 1.0%, preferred 0.5%; iron max. 0.06%, preferred 0.02%; silicon max. 0.08%, preferred 0.04%; calcium max. 0.12%, preferred 0.12%; sodium, max. 0.12%; sulfur max. 2.0%, preferred 1.0%. As will be apparent to those skilled in the art these levels are necessary since impurities, such as metallic elements, form alloys making it difficult to control the aluminum composition. Since coal, such as bituminous coal for example, in the unpurified form can have an ash impurity content, including high levels of alumina, silica and iron oxide, in the neighborhood of 12%, the difficulty of meeting these stringent requirements can be readily appreciated.

Campbell et al disclose in their article that their most effective leaching reagent is a mixture of hydrochloric and hydrofluoric acid. They also indicate that the mineral content of lower rank coals, e.g. lignite, is reduced slightly more using a caustic leaching stage in addition to this acid mixture. Also, they indicated that the use of nitric acid provided slightly lower final ash content than this acid mixture (hydrochloric/hydrofluoric) but the nitric was considered undesirable because of its destructive action on the coking property of coal. With respect to the impurity levels referred to above, the Campbell et al article discloses that only two of the coals leached with the hydrochloric/hydrofluoric acid combination met the maximum impurity levels even when the starting ash content was not greater than 2.3%. None of the coals leached using their hydrochloric/hydrofluoric mixture met all of the preferred impurity levels.

Another example of coal leaching is disclosed in Murphy et al U.S. Pat. No. 3,393,978 which teaches that ash-forming impurities in carbonaceous materials such as coal can be removed by treating such carbonaceous material with a solution of a water soluble inorganic acid, e.g., $HNO_3$, HF or HCl, and forming water soluble salts of the impurities. However, their example shows that coal char so treated had its ash content reduced from 11.2% to only 10%. A caustic treatment prior to the acid treatment resulted in the ash being further reduced.

Also, in the prior art, Reggel et al in an article entitled "Preparation of Ash-Fee, Pyrite-Free Coal by Mild Chemical Treatments", ACS, Division of Fuel Preprints, Volume 17(1), 1972, disclose that the ash content of coal can be reduced to a low level in a two-step process which includes subjecting the coal to a caustic digest followed by an acid treatment. Campbell and Murphy, referred to hereinabove, also suggest that it is necessary to use two steps (caustic leach prior to the acid treatment) to lower the impurities to an acceptable level.

Quite surprisingly, I have discovered a highly economical one-step leaching method for purifying high impurity coal. In a preferred embodiment, the method employs the use of an oxidant in an aqueous solution of nitric and hydrofluoric acid. This method provides a purified coal with a very low ash, iron and silicon content which is highly suitable for use in carbon electrodes.

SUMMARY OF THE INVENTION

An object of this invention is to provide an economical method for purifying coal.

Another object of this invention is to provide an economical method for purifying coal char.

These and other objects will become apparent from the description, drawing and claims appended hereto.

In accordance with these objects, a process for providing high purity coal comprises forming an aqueous leaching solution containing nitric and hydrofluoric acid, contacting impure coal with this solution to form a slurry, and during the contacting, bubbling a gaseous oxidant therethrough to enhance leaching and to provide mixing action within the slurry. Thereafter, the acid is removed and the coal washed with water.

BRIEF DESCRIPTION OF THE DRAWING

In the description below, reference is made to the sole FIGURE which is a flow chart illustrating a method of purifying coal in accordance with the present invention.

DETAILED DESCRIPTION OF THE PREFERRED EMBODIMENTS

In the drawing there is provided a schematic of a method for providing purified coal suitable for use in carbon electrodes. In its broadest aspects, coal containing impurities to be removed is contacted with an aqueous leaching solution containing hydrofluoric acid and at least one oxidizing agent selected from the group consisting of $HNO_3$, $H_2O_2$ and $Fe_2(SO_4)_3$ to form a slurry. A gaseous oxidant such as air or oxygen can be bubbled through the slurry to provide mixing of the slurry and to provide additional oxidizing material. After a suitable contacting period the solution is removed and the coal is washed with water. Preferably, the coal, prior to subjection to the chemical treatment step, is subjected to initial beneficiation or mechanical separation such as by a flotation process or heavy media or magnetic separation such as well known to those skilled in the art to reduce the impurities in the coal down to about 5% ash content.

A source of coal suitable for use in the present invention is anthracite, bituminous, lignite or brown coal or the like. Such coal, even with a high impurity level, e.g. 12% ash, offers no problems in the process of the present invention. The impurities of such coal can be lowered well below the level specified hereinabove for use in electrodes. Preferably, such coal to be treated in accordance with this invention has a particle size not greater than 8 mesh (Tyler Series), more preferably, the size is not greater than 14 mesh (Tyler Series) and most preferably, not greater than 48 mesh (Tyler Series).

With respect to the aqueous leaching solution, a preferred combination contains nitric and hydrofluoric acid. The combination can contain 2 to 25 wt. % nitric acid with a preferred amount being 6 to 20 wt. %. The amount of hydrofluoric acid in the combination can be 0.5 to 10 wt. % with 2 to 7 wt. % being preferred. With these amounts of hydrofluoric acid, the solution can contain 2 to 25 wt. % ferric sulfate [$Fe_2(SO_4)_3$] instead of the nitric acid.

In a variation of the leaching solution, hydrogen peroxide can be used instead of the nitric acid or it can be used in addition to the nitric acid. When hydrogen peroxide is used instead of nitric acid, the aqueous solution can contain 1.0 to 25.0 wt. % $H_2O_2$ and 0.5 to 15.0 wt. % HF, the remainder essentially water. Preferably, the concentration of $H_2O_2$ is 10.0 to 20.0 wt. % and HF is 3.0 to 8.0 wt. %. When the solution contains $HNO_3$, $H_2O_2$ and HF, the $HNO_3$ concentration can be in the range of 1.0 to 25.0 wt. %, $H_2O_2$ 1.0 to 25.0 wt. % and HF 0.5 to 15.0 wt. %, the remainder water. Preferably, the $HNO_3$ is in a range of 4.0 to 18.0 wt. %, $H_2O_2$ 8.0 to 18.0 wt. % and HF 2.0 to 8.0 wt. %.

In the practice of the present invention, the ratio of volume of leaching solution in milliliters to the weight of dry coal in grams should be from about 5:1 to 20:1. Preferably, this ratio should be in the range of 10:1 to 15:1 in order to have efficient leaching of impurities.

With respect to time and temperature of contacting the coal with the solution, the time can range from 15 to 120 minutes in a temperature range of 20° to 100° C, or higher in a pressurized container. Preferably, the contacting period is in a range of 45 to 90 minutes at a preferred temperature in the range of 60° to 95° C.

Within the above concentration, time, temperature and ratio boundaries for contacting the coal with leaching solution, there are processing features which can be important in order to provide a high purity carbonaceous material. For example, it is advantageous to provide mixing action to aid the leaching of impurities from the coal. The mixing action can be provided by means of an impeller or baffles made from a material, e.g. plastic, resistant to the leaching solution. However, while the nitric-hydrofluoric solution can leach high impurity coal (12%) to a purity level well below that required for electrodes, for example, it has been found that leaching of impurities can be facilitated by use of a gaseous oxidant material in addition to the nitric acid. Thus, it has been found that reduction of the impurity level can be greatly enhanced by bubbling a source of oxygen through the slurry of leaching solution and coal to provide additional oxidant and also to provide mixing or blending of the slurry. A highly suitable source of additional oxidant material is air, however, oxygen gas has a highly beneficial effect also. With respect to the mixing aspect, inert gases such as, for example, $N_2$ and the like can have a beneficial effect but as will be seen hereinafter, they are not as effective as air or oxygen or the like. In addition to these gases, vaporized liquids, such as steam can be useful. Such steam can be that autogenously produced during leaching.

After these treatments, the coal is separated from the leaching solution by filtering, for example, and then subjected to a water wash. In view of the limitation on iron and silicon and also calcium and the like as noted hereinabove, preferably the wash water is substantially free of these materials. Thus, it can be beneficial to wash with deionized water. Also, distilled or demineralized water can be suitable. Normally, room temperature water can be used; however, water at temperatures higher than room can be more advantageous although the temperature, in most cases, need not be greater than 100° C.

To remove volatile matter, the leached coal is normally calcined at a temperature in the range of 500° to 1300° C for a period of ½ to 20 hours. Normally, for electrode applications, for example, cleaned or purified coal should be carbonized at a rate slow enough to provide dense carbon particles. Fast heating rates may promote the expansion of the coal particles making an undesirable product having lower density than that normally desirable for electrodes.

While it has been indicated that the coal can be subjected to the purification process of the present invention prior to carbonizing or calcining as mentioned, it is within the purview of this invention to purify a coal which has been calcined first. That is, the purification system of the present invention is suitable for removing impurities from coal which has been calcined, as noted hereinabove for example, to remove volatile matter. The degree of calcining or carbonizing prior to purification by the present invention can be controlled depending largely on the amount of volatile matter to be removed. Thus, while in certain cases it may be desirable to only partially calcine the coal prior to purification, it may be completely calcined to provide a char or coke product.

In providing electrodes for an aluminum producing cell, the purified calcined coal product may be combined with a suitable binder such as pitch, which thereafter may be heated in a mold to the desired configuration. In a preferred embodiment, the purified product of the present invention can be blended with a source of carbonaceous material having a particle size greater than that of the purified product. For example, if the purified product has a particle size not greater than 14 mesh (Tyler Series) then the carbonaceous material should have a particle size larger than 14 mesh and preferably, the particle size of such carbonaceous material is greater than 48 mesh (Tyler Series).

A suitable blend of materials for electrode use can have 25 to 45 wt. % carbonaceous material, e.g., petroleum coke, and 55 to 75 wt. % purified calcined coal of the invention. This blend can be made into electrodes by forming a mix of the blend and pitch wherein the mix contains about 10 to 30 wt. % pitch. The electrode can be formed by heating the mix in a suitable mold and thereafter conditioned for use by heating in a ring furnace, for example.

The following examples are still further illustrative of the invention.

EXAMPLE 1

A sample of Indiana No. 6 coal, previously beneficiated to an impurity level measured by an ash content of about 4.3%, was ground to −48 mesh (Tyler Series) and leached for 60 minutes in a solution at 80° C containing 18 wt. % nitric acid and 7 wt. % hydrofluoric acid, the remainder deionized water. The ratio of solution in milliliters to dry coal in grams was 15:1. During the leaching period, air was bubbled through the slurry. Thereafter, the leached coal was filtered, washed with room temperature deionized water and dried. The resultant purified coal was analyzed for mineral content and found to have 0.012 wt. % iron, 0.002 wt. % silicon, 0.018 wt. % calcium and 0.01 wt. % sodium. In addition, the aluminum content was reduced to 0.013 wt. %. The ash content of the coal was found to be 0.17 wt. %.

EXAMPLE 2

A sample of Indiana No. 6 coal was previously beneficiated to an impurity level of 2.6 wt. % ash and then treated as in Example 1 except the leaching solution contained 18 wt. % hydrogen peroxide and 6 wt. % hydrofluoric acid, the remainder deionized water. The resultant purified coal was analyzed for mineral content and found to have 0.017 wt. % iron and 0.004 wt. % silicon. The ash content of the coal was found to be 0.22 wt. %.

EXAMPLE 3

Four samples of Indiana No. 6 coal, previously beneficiated to an impurity level of 2.6 wt. % ash and ground to a −48 mesh (Tyler Series), were leached for 45 minutes in a solution at 55° C containing 18 wt. % hydrogen peroxide and 6 wt. % hydrofluoric acid, the remainder deionized water. The ratio of leaching solution in milliliters to coal in grams was 15:1. During the leaching, oxygen was bubbled through a first sample, air through the second and nitrogen through the third. No gases were bubbled through the fourth sample. Thereafter, the leached coal samples were filtered, washed in room temperature deionized water and dried. Analysis of the resultant purified coal from these tests for ash, iron and silicon was as tabulated below.

| Gas | ASH (wt.%) | Iron (wt.%) | Silicon (wt.%) |
|---|---|---|---|
| Oxygen | 0.31 | 0.027 | 0.019 |
| Air | 0.32 | 0.034 | 0.034 |
| Nitrogen | 0.47 | 0.055 | 0.034 |
| None | 0.51 | 0.057 | 0.042 |

While the results of the tests have been shown mostly with respect to the level of ash, iron and silicon, it should be understood that the level of other impurities, such as sulfur, calcium, sodium, magnesium, titanium and aluminum are effectively reduced to permit wide use of the purified product.

From these tests it can be seen that one of the most effective leaching solutions contains the combination of nitric and hydrofluoric acid. Also, it can be seen that hydrogen peroxide and hydrofluoric acid provide efficient leaching of impurities and that mixing with oxygen, air and nitrogen is effective in further lowering the impurity levels.

While the invention has been described with reference to providing purified coal or carbonaceous material suitable for use in the production of aluminum, for example, as anodes, it should be understood that the application of such coal is not necessarily limited thereto. For example, purified coal of the invention can find use in the electric arc furnace electrodes for the production of steel. Also, because of the high level of purify obtained, purified coal of the present invention can be used for most applications where petroleum derived coke, carbon and graphite are normally used. Other uses will be apparent to those skilled in the art.

While the invention has been described in terms of preferred embodiments, the claims appended hereto are intended to encompass all embodiments which fall within the spirit of the invention.

Having thus described my invention and certain embodiments thereof, I claim:

1. A method of removing impurites from coal comprising:
   (a) providing an aqueous leaching solution containing at least one oxidizing agent selected from the group consisting of $HNO_3$, $H_2O_2$ and $Fe_2(SO_4)_3$, and 0.5 to 10 wt. % hydrofluoric acid, the remainder essentially water;
   (b) contacting said coal with said solution to form a slurry having a solution to coal ratio in the range of 5:1 to 20:1, said contacting time being for a period in the range of 15 to 120 minutes at a temperature in the range of 20° to 100° C;
   (c) mixing said slurry with a gaseous media selected from the group consisting of air, oxygen and nitrogen;
   (d) separating said coal from said solution; and
   (e) washing said coal with water to provide purified coal.
2. The method according to claim 1 wherein said oxidizing agents are nitric acid and hydrogen peroxide.
3. The method according to claim 1 wherein said oxidizing agent is nitric acid.
4. The method according to claim 1 wherein said oxidizing agent is hydrogen peroxide.
5. The method according to claim 1 wherein said solution contains 6 to 20 wt. % of nitric acid and 2 to 7 wt. % hydrofluoric acid.
6. The method according to claim 1 wherein said contacting is for a period in the range of 45 to 90 minutes.
7. The method according to claim 1 wherein the ratio is in the range of 10:1 to 15:1.
8. The method according to claim 5 wherein said gaseous mixing media is air.
9. The method according to claim 1 wherein said washing of said coal is performed with demineralized water.
10. The method according to claim 1 wherein said coal to be contacted with said leaching solution has a particle size not greater than 14 mesh (Tyler Series).
11. The method according to claim 1 wherein said coal is calcined prior to said contacting.
12. A method of forming carbon electrodes from impure coal comprising:
    (a) providing an aqueous leaching solution containing 2 to 25 wt. % of at least one oxidizing agent selected from the group consisting of $HNO_3$, $H_2O_2$ and $Fe_2(SO_3)_4$, and 0.5 to 10 wt. % hydrofluoric acid, the remainder essentially water;
    (b) contacting said coal with said solution to form a slurry having a solution to coal ratio in the range of 5:1 to 20:1, said contacting time being for a period in the range of 15 to 120 minutes;
    (c) mixing said slurry with a gaseous media selected from the group consisting of air, oxygen and nitrogen;
    (d) separating said coal from said solution;
    (e) washing said coal with water to provide purified coal;

(f) calcining said washed coal to remove volatile matter therefrom;

(g) blending said calcined coal with a coked carbonaceous material having a particle size larger than said coal;

(h) mixing said blend of calcined coal and carbonaceous material with pitch to provide a mix; and (i) shaping said mix to an electrode configuration by heating in a mold.

13. The method according to claim 12 wherein said impure coal has a particle size not greater than 14 mesh (Tyler Series).

14. The method according to claim 12 wherein said oxidizing agent is nitric acid.

15. The method according to claim 12 wherein said solution contains 6 to 20 wt % nitric acid and 2 to 7 wt. % hydrofluoric acid.

16. The method according to claim 12 wherein said contacting is for a period in the range of 45 to 90 minutes.

17. The method according to claim 12 wherein the ratio is in the range of 10:1 to 15:1.

18. The method according to claim 12 wherein said blend contains 25 to 45 wt. % carbonaceous material and 55 to 75 wt. % purified coal.

19. The method according to claim 18 wherein said carbonaceous material is petroleum coke.

20. The method according to claim 12 wherein said mix contains 10 to 30 wt. % pitch.

21. A method of forming carbon electrodes from impure coal comprising:

(a) providing an aqueous leaching solution containing 2 to 25 wt. % nitric acid and 0.5 to 10 wt. % hydrofluoric acid, the remainder water;

(b) contacting said coal having a particle size not greater than 14 mesh (Tyler Series) with said solution to form a slurry having solution to coal ratio in the range of 5:1 to 20:1, said contacting being for a time period in the range of 45 to 90 minutes at a temperature in the range of 60° to 100° C;

(c) mixing said slurry with air;

(d) separating said coal from said solution;

(e) washing said coal with demineralized water at a temperature not greater than 100° C;

(f) calcining said washed coal at a temperature of 500° to 1300° C for a period of ½ to 20 hours to remove volatile matter therefrom;

(g) blending said calcined coal with a carbonaceous material having a particle size greater than 14 mesh (Tyler Series) to provide a blend having 25 to 45 wt. % carbonaceous material and 55 to 75 wt. % calcined coal;

(h) mixing said blend of calcined coal and said carbonaceous material with pitch to provide a mix containing 10 to 30 wt. % pitch; and (i) shaping said mix to an electrode configuration by heating in a mold.

* * * * *

UNITED STATES PATENT AND TRADEMARK OFFICE

CERTIFICATE OF CORRECTION

PATENT NO. : 4,083,940

DATED : April 11, 1978

INVENTOR(S) : Subodh K. Das

It is certified that error appears in the above-identified patent and that said Letters Patent are hereby corrected as shown below:

| | |
|---|---|
| Abstract, lines 2-3 | Change "hydrofluric" to --hydrofluoric--. |
| Col. 1, line 33 | After "sodium" delete --,--. |
| Col. 1, line 51 | Change "the" to --that--. |
| Col. 2, line 5 | Change "Ash-Fee" to --Ash-Free--. |
| Col. 5, line 67 | Change "purify" to --purity--. |
| Col. 6, line 41 Claim 8 | Change "5" to --1--. |

Signed and Sealed this

*Twenty-second* Day of *August 1978*

[SEAL]

*Attest:*

RUTH C. MASON
*Attesting Officer*

DONALD W. BANNER
*Commissioner of Patents and Trademarks*